United States Patent
Soulie et al.

(10) Patent No.: US 11,338,937 B2
(45) Date of Patent: May 24, 2022

(54) INSTALLATION COMPRISING AN ARTICULATED ARM AND A MACHINE TOOL, AND CORRESPONDING MACHINING METHOD

(71) Applicant: FIVES MACHINING, Saint Laurent les Tours (FR)

(72) Inventors: Pascal Soulie, Capdenac-Gare (FR); Sinziana Lungu, Capdenac-Gare (FR); Philippe Cuminal, Capdenac-Gare (FR); Jean-François Sartori, Capdenac-Gare (FR); Jean-Pierre Nicaise, Capdenac-Gare (FR)

(73) Assignee: FIVES MACHINING, Saint Laurent les Tours (FR)

( * ) Notice: Subject to any disclaimer, the term of this patent is extended or adjusted under 35 U.S.C. 154(b) by 373 days.

(21) Appl. No.: 16/338,861

(22) PCT Filed: Oct. 3, 2017

(86) PCT No.: PCT/EP2017/075066
§ 371 (c)(1),
(2) Date: Apr. 2, 2019

(87) PCT Pub. No.: WO2018/065408
PCT Pub. Date: Apr. 12, 2018

(65) Prior Publication Data
US 2021/0284359 A1    Sep. 16, 2021

(30) Foreign Application Priority Data
Oct. 3, 2016 (FR) ...................................... 16 59519

(51) Int. Cl.
*B64F 5/10* (2017.01)
*B23Q 9/00* (2006.01)
(Continued)

(52) U.S. Cl.
CPC .............. *B64F 5/10* (2017.01); *B23Q 9/0007* (2013.01); *B23Q 16/005* (2013.01); *B23Q 17/20* (2013.01); *B25J 19/02* (2013.01)

(58) Field of Classification Search
CPC .... B23Q 9/0007; B23Q 16/005; B23Q 17/20; Y10T 29/53983; B64F 5/10;
(Continued)

(56) References Cited

U.S. PATENT DOCUMENTS

2008/0077276 A1 * 3/2008 Montero Sanjuan .... B21J 15/14
700/245
2012/0014759 A1    1/2012 Sarh et al.
(Continued)

FOREIGN PATENT DOCUMENTS

| ES | 2 264 850 | 1/2007 |
| JP | 06-336392 | 12/1994 |
| WO | WO 2004/028755 | 4/2004 |

OTHER PUBLICATIONS

International Search Report, PCT/EP2017/075066, dated Dec. 6, 2017.
French Search Report, FR 1659519, dated Jun. 9, 2017.

*Primary Examiner* — Matthew P Travers
(74) *Attorney, Agent, or Firm* — Nixon & Vanderhye (57) ABSTRACT

A machining apparatus is borne by an articulated arm and includes: a casing defining an opening to be placed by the articulated arm in a machining position so the opening faces the surface to be machined; at least three bearers attached to the casing to rest against the surface to be machined in the machining position; an attachment system fixing the casing to the surface to be machined; at least one support mounted to move with respect to the casing, and a machine-tool mounted on the support; and at least one position sensor providing position parameters representing a relative position of the surface to be machined with respect to the casing.

(Continued)

Also included is a control system operating the support and to move the machine-tool with respect to the casing according to a movement instruction, the control system being designed to calculate the movement instruction using the position parameters.

19 Claims, 5 Drawing Sheets

(51) Int. Cl.
    *B25J 19/02*     (2006.01)
    *B23Q 16/00*     (2006.01)
    *B23Q 17/20*     (2006.01)

(58) Field of Classification Search
    CPC ..... B25J 11/005–11/007; B25J 15/0019; B25J 19/02; B25J 19/028; B23P 2700/01
    See application file for complete search history.

(56) References Cited

U.S. PATENT DOCUMENTS

| | | | |
|---|---|---|---|
| 2014/0206258 A1* | 7/2014 | Peng | B24B 5/08 |
| | | | 451/5 |
| 2015/0362305 A1* | 12/2015 | Ferrari | G01B 21/047 |
| | | | 33/503 |
| 2018/0169813 A1* | 6/2018 | Wanner | B23Q 15/22 |

\* cited by examiner

INSTALLATION COMPRISING AN ARTICULATED ARM AND A MACHINE TOOL, AND CORRESPONDING MACHINING METHOD

BACKGROUND OF THE INVENTION

Field of the Invention

The present invention relates to an installation for machining an object, notably part of an aeroplane wing, the object defining a surface that is to be machined, for example the perimeter of an inspection hole, the installation comprising a machine tool. The invention also relates to a corresponding machining method.

Description of Related Art

Aeroplane wings generally comprise inspection holes on their lower (intrados) surface. These inspection holes are normally closed by a cover continuous with the rest of the wing. When the cover is removed, the inspection hole provides access to the inside of the wing, for example for performing maintenance.

The periphery of such an inspection hole is generally machined when the lower part of the wing is already assembled. This part is therefore already extremely extensive. The inspection hole is therefore an opening, for example elliptical, on a very extensive skew surface.

The number of inspection holes to be machined is typically several tens of holes, for example around thirty. The machine tool has in all cases to be positioned very precisely, because the machining tool follows a preprogramed path.

Each inspection hole is generally first of all made with a very high-pressure waterjet cutter. The edges of the inspection hole then need to be machined precisely.

In order to perform such machining operations it is known practice to use a machine tool comprising a housing defining an opening, and a machining tool mounted with the ability to move inside the housing.

According to a first procedure, the machine tool is fixed with respect to the workshop housing the machining installation and the wing is moved until the inspection hole that is to be machined is facing the opening. The wing is then immobilised by suitable means and machining is performed by moving the machining tool with respect to the housing. However, the positioning of the wing is complex and the wing has to be moved a number of times in order to process all the inspection holes.

According to a second procedure, the machine tool is fixed to a chassis secured to the object that is to be machined. That entails moving the machine tool in order to machine each inspection hole.

It is an object of the invention therefore to provide an installation for machining an object, notably part of an aeroplane wing, which is quicker than the existing installations while at the same time conforming to the quality requirements of the machining operations.

BRIEF SUMMARY OF THE INVENTION

To this end, the invention relates to an installation for machining an object, notably part of an aeroplane wing, the object defining a surface that is to be machined, for example the perimeter of an inspection hole, the installation comprising an articulated arm, and a machine tool borne by the articulated arm and comprising:

- a housing defining at least one opening and intended to be placed by the articulated arm in a machining position in which the opening is situated facing the surface that is to be machined,
- at least three bearers secured to the housing and intended to bear against the surface that is to be machined in the machining position,
- an attachment system for fixing the housing to the surface that is to be machined,
- at least one support mounted with the ability to move with respect to the housing, and a machining tool designed to be mounted on the support, and
- at least one position sensor, for example a camera, designed to provide position parameters indicative of a relative position of the surface that is to be machined with respect to the housing, the installation further comprising a control system designed to actuate the support and move the machining tool with respect to the housing according to a movement instruction, the control system being designed to calculate the movement instruction using the position parameters.

According to particular embodiments, the installation comprises one or more of the following features, considered in all technically feasible combinations:

- the bearers are respectively equipped with strain gauges designed to measure pressure forces exerted respectively by the bearers on the surface that is to be machined;
- the attachment system comprises at least three suction cups secured to the housing and designed to be pressed against the surface that is to be machined in the machining position, and at least one vacuum-generating member for selectively creating a vacuum between the suction cups and the surface that is to be machined;
- the machine tool further comprises at least three telemeters designed to respectively provide at least three distance parameters, each distance parameter being respectively indicative of a distance between one of the telemeters and the surface that is to be machined;
- the three bearers are respectively situated substantially in the middle of the three suction cups; and
- the installation further comprises at least one probe designed to be mounted on the support, preferably at substantially the same point as the machining tool, the control system being designed to move the support and the probe in order to probe the surface that is to be machined and calculate shape parameters indicative of a shape of the surface that is to be machined, the control system being further designed to calculate the movement instruction for the machining tool to take account of the shape parameters, the installation preferably comprising a magazine designed to accept the probe or the machining tool in respective storage positions.

The invention also relates to a method for machining an object, notably part of an aeroplane wing, the object defining a surface that is to be machined, for example the perimeter of an inspection hole, the method comprising the following steps:

- provision of an articulated arm, of a machine tool borne by the articulated arm, and of a control system, the machine tool comprising a housing defining at least one opening, at least three bearers secured to the housing, an attachment system, at least one support mounted with the ability to move with respect to the housing, a machining tool and at least one position sensor, for example a camera, mounted on the support;
- mounting of the machining tool on the support;

placement of the housing, by the articulated arm, in a machining position in which the opening is situated facing the surface that is to be machined, the placement involving applying the three bearers against the surface that is to be machined;

fixing of the housing on the surface that is to be machined using the attachment system, provision, by the position sensor, of position parameters indicative of a relative position of the surface that is to be machined with respect to the housing in the machining position;

calculation, by the control system, of a movement instruction for the machining tool, using the position parameters; and actuation, by the control system, of the support and movement of the machining tool with respect to the housing in accordance with the calculated movement instruction.

According to particular embodiments, the method comprises one or more of the following features, considered in all technical feasible combinations:

as the three bearers are applied to the surface that is to be machined, the strain gauges measure pressure forces exerted respectively by the bearers on the surface that is to be machined, and, as the housing is fixed to the surface that is to be machined, suction cups are applied to the surface that is to be machined;

the method is such that:
the machine tool provided comprises at least three telemeters; and
the placement of the housing involves provision of at least three distance parameters by the telemeters respectively, each distance parameter being respectively indicative of a distance between one of the telemeters and the surface that is to be machined.

The said positioning of the housing involves:
in a housing approach phase, a calculation, by the control system, of at least one parameter indicative of an orientation of the housing with respect to the surface that is to be machined, the calculation using the said distance parameters; a controlling of the articulated arm by the control system to take account of the orientation parameter; and optionally a use of the position sensor, a calculation of at least one parameter pertaining to the position of the housing with respect to the surface that is to be machined and a controlling of the articulated arm by the control system in accordance with the position parameter; and/or a bringing of a first of the bearers into contact with the surface that is to be machined and then a bringing of a second of the bearers into contact, with the first bearer remaining in contact, followed by a bringing of the third of the bearers into contact, with the other two of the bearers remaining in contact, each of the bringings into contact preferably being performed in such a way that the said corresponding pressure force progressively reaches a predetermined value.

The method further comprises:
a mounting of a probe on the support, preferably at substantially the same point as the machining tool; and after the placing of the housing in the machining position, a probing of the surface that is to be machined involving: a moving of the support and of the probe with respect to the housing by the control system; and a calculation, by the control system, of shape parameters indicative of a shape of the surface that is to be machined;

the calculation of the movement instruction for the machining tool by the control system using the shape parameters.

The method is such that:
the probing takes place after the said fixing of the housing to the surface that is to be machined and before the mounting of the machining tool on the support; and the housing remains fixed to the surface that is to be machined during the mounting of the machining tool on the support;

the machine tool preferably comprising a magazine designed to accept the probe or the machining tool in respective storage positions.

after probing, the housing is moved away from the surface that is to be machined by the articulated arm, the probe is dismantled from the support, then the machining tool is mounted on the support and the housing is positioned again in order to return the housing to the machining position.

BRIEF DESCRIPTION OF THE SEVERAL VIEWS OF THE DRAWING(S)

The invention will be better understood from reading the following description, given solely by way of example and made with reference to the attached drawings in which.

DETAILED DESCRIPTION OF THE INVENTION

An installation 1 according to the invention designed to machine an object 5 is described with reference to FIG. 1.

Figure 2:
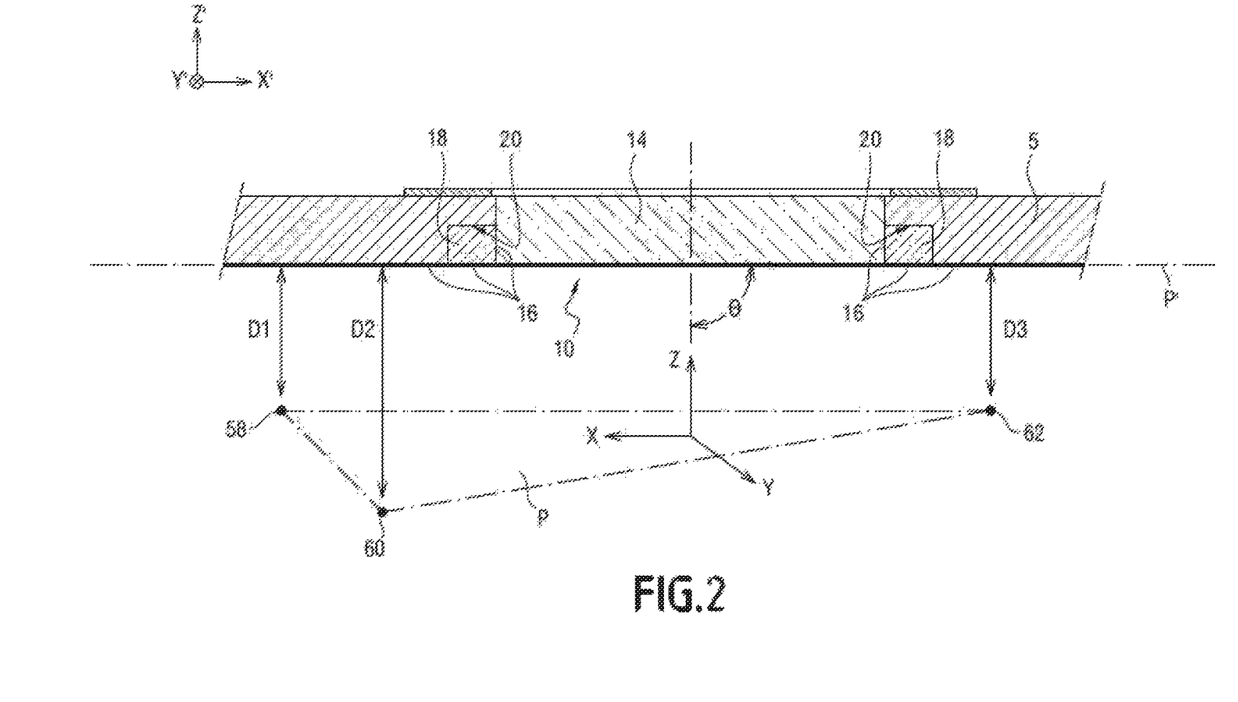
FIG. 2 is a partial sectioned view of the part of an aeroplane wing and of certain elements of the machine tool which are depicted in FIG. 1.

The object 5 is, for example, part of an aeroplane wing made of composite. The object 5 is, for example, the lower part, or intrados, of the aeroplane wing and comprises a plurality of inspection holes 10, of which one is depicted in FIG. 2 and in FIG. 4. The object 5 extends in a longitudinal direction X', for example horizontal.

Also defined are a transverse direction Y', substantially perpendicular to the longitudinal direction X' and substantially horizontal, and a vertical direction Z'.

The object 5 has a skew lower surface 12, possessing curvature in the longitudinal direction X' and in the transverse direction Y'.

Each inspection hole 10 (FIG. 2) is obtained for example by high-pressure waterjet cutting using a machine (not depicted) able to remove a piece of material 14. Each inspection hole 10 for example has an elliptical shape depicted in FIG. 4.

The perimeter of each inspection hole 10 defines a surface that is to be machined 16 (FIG. 2). In the example depicted, the purpose of the machining is to remove a portion of material 18 all around the inspection hole 10 in order to create a shoulder 20.

It should be noted that, in FIG. 2, the object 5 has been depicted as rectilinear for the sake of simplification. It does in fact, as indicated hereinabove, exhibit curvature in the longitudinal direction X' and in the transverse direction Y'.

Figure 1:
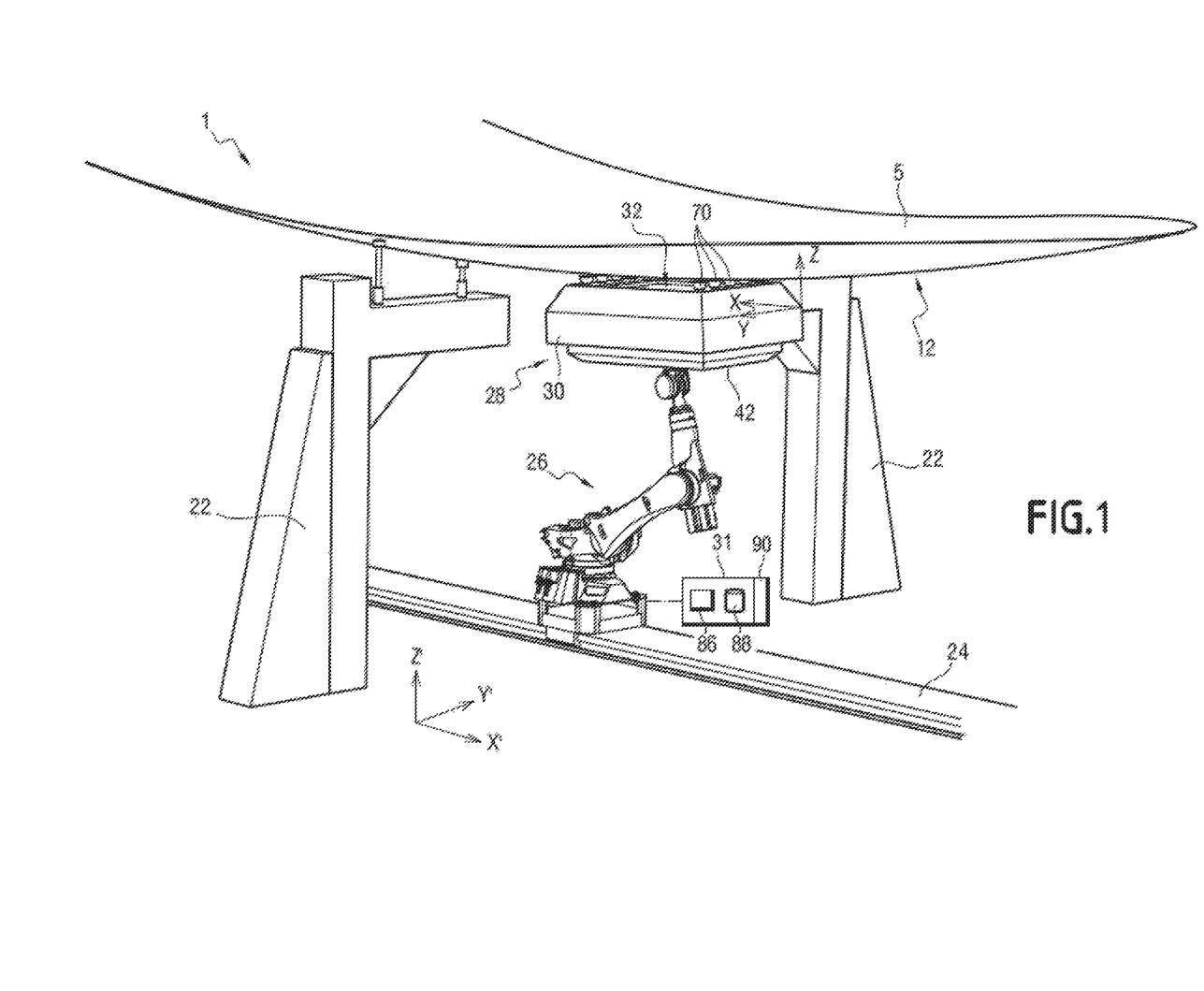
FIG. 1 is a schematic perspective view of an installation according to the invention.

As visible in FIG. 1, the installation 1 comprises gantries 22 to support the object 5, a rail 24, an articulated arm 26 mounted on the rail, and a machine tool 28 borne by the articulated arm.

The installation 1 also comprises a control system 31 designed to control the articulated arm 26 and the machine tool 28.

The rail 24 is for example situated transversely between the gantries 22. The rail 24 extends in the longitudinal direction X' underneath the object 5.

The articulated arm 26 is designed to be moved by the control system 31 in a translational movement along the rail 24. The articulated arm 26 is advantageously designed to move the machine tool 28 with respect to the object 5 in a translational movement in the three directions X', Y', Z' and in inclination about the directions X' and Y'.

The machine tool 28 comprises a housing 30 defining an opening 32 and intended to be placed by the articulated arm 26 in a machining position (FIG. 1), in which the opening 32 is situated facing the surface that is to be machined 16.

The opening 32 extends for example in a plane P perpendicular to a direction Z which is advantageously vertical when the articulated arm 26 is in a neutral position (not depicted).

The opening 32 is, for example, rectangular in the plane P, and its edges define a direction X and a direction Y which are substantially perpendicular to one another and to the direction Z.

Figure 3:
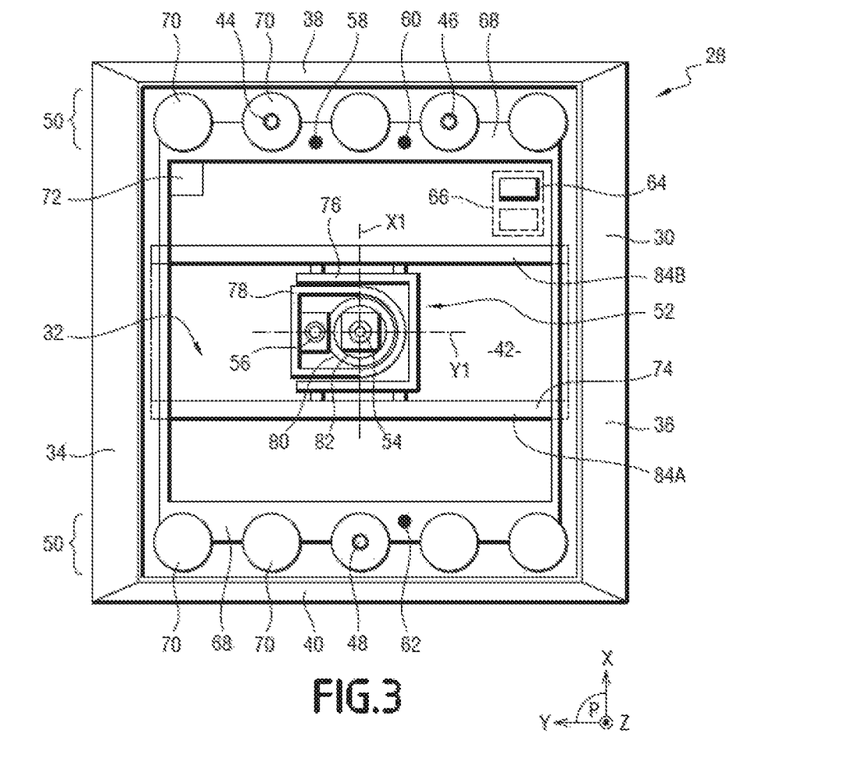
FIG. 3 is a view from above of the machine tool depicted in FIG. 1.

The housing 30 has, for example, a substantially parallelepipedal overall shape with two lateral faces 34, 36 (FIG. 3) which are opposite one another in the direction Y and parallel to the direction X, and two lateral faces 38, 40 which are opposite one another in the direction X and substantially parallel to the direction Y. The housing 30 also comprises a bottom 42 extending perpendicular to the direction Z and opposite the opening 32 in this same direction.

The machine tool 28 also comprises three bearers 44, 46, 48 secured to the housing 30 and intended to bear against the surface that is to be machined 16 in the machining position, an attachment system 50 for fixing the housing to the surface that is to be machined, a support 52 mounted with the ability to move with respect to the housing, a machining tool 54 designed to be mounted on the support 52, and a position sensor 56 likewise mounted on the support.

The machine tool 28 optionally comprises three telemeters 58, 60, 62 and a probe 64 designed to be mounted on the support 52, preferably at substantially the same point as the machining tool 54.

The machining tool 54 and the probe 60 are intended to be mounted on the support 52 or stored in a magazine 66, advantageously situated inside the housing 30.

As an alternative (not depicted), the magazine 66 is situated on the outside of the machine tool 28.

The three bearers 44, 46, 48 are equipped with strain gauges 44A, 46A, 48A designed to measure the pressure forces F1, F2, F3 (FIG. 4) exerted respectively by the bearers on the surface that is to be machined 16. The bearers 44, 46, 48 for example project in the direction Z from a rim 68 of the housing 30. For example, the bearers 44, 46 are aligned in the direction Y and situated on the side of the face 38 of the housing with respect to the opening 32. For example, the bearer 48 is situated on the other side of the opening 32 with respect to the bearers 44, 46, in the direction X. As visible in FIG. 4, the bearers 44, 46, 48 advantageously form an isosceles triangle when viewed in the direction Z.

In this exemplary embodiment of the invention, the attachment system 50 comprises suction cups 70 secured to the housing 30 and designed to be pressed against the surface that is to be machined 16 in the machining position, and a vacuum-creating member 72 for selectively creating a vacuum between the suction cups and the surface that is to be machined.

The suction cups 70 are, for example, organised in two rows positioned one on each side of the opening 32 in the direction X, the rows being substantially parallel to the direction Y. Each row comprises, for example, five suction cups. Advantageously, three of the suction cups 70 are situated around the bearers 44, 46, 48. Stated differently, the bearers 44, 46, 48 are situated respectively in the middle of three of the suction cups 70 when viewed in the direction Z.

The vacuum-creating member 72 is connected to each of the suction cups 70 by a fluid network (not depicted).

According to other exemplary embodiments of the invention, the attachment system 50 uses attachment means suited to the material that is to be machined. For example, in the case of a surface made of steel, the attachment system 50 may employ electromagnets.

The position sensor 56 comprises for example a camera comprising a laser for better precision in control of the shape.

The telemeters 58, 60 are, for example, situated on one side of the opening 32 in the direction X and are substantially aligned in the direction Y. The telemeter 62 is, for example, situated on the other side of the opening 32 from the telemeters 58, 60 in the direction X. The telemeters 58, 60, 62 are designed to respectively provide at least three distance parameters, each distance parameter being respectively indicative of a distance D1, D2, D3 (FIG. 2) between one of the telemeters and the surface that is to be machined 16 in the direction Z.

The support 52 is designed to move the machining tool 54 or the probe 64 with respect to the housing 30 in a translational movement in the three directions X, Y and Z and advantageously in inclination with respect to the directions X and Y. Advantageously, the support 52 is also designed to go and find the machining tool 54 or the probe 64 in the magazine 66 or return them to the magazine.

In the example depicted, the support 52 comprises a first part 74 mounted with the ability to effect translational movement on the housing 30 in the direction X, a second part 76 mounted with the ability to effect translational movement on the first part in the direction Y, and a third part 78 mounted with the ability to effect translational movement on the second part in the direction Z. The support 52 also comprises a fourth part 80 mounted with the ability to rotate on the third part about an axis X1 substantially parallel to the direction X, and a fifth part 82 mounted with the ability to rotate on the fourth part about an axis Y1 secured to the fourth part and substantially parallel to the direction Y when the support is in a position of rest depicted in FIG. 3.

The first part 74 comprises for example two beams 84A, 84B extending in the direction Y and between which the second part 76 is mounted.

The position sensor 56 is for example secured to the fourth part 80.

The machining tool 54, or the probe 64, are mounted on the fifth part 82.

The control system 31 comprises for example a processor 86, a memory 88 and advantageously a man/machine interface 90.

The memory 88 is designed to store information relating to the shape of the inspection holes 10, and software instructions which, when executed by the processor 86, allow control over the articulated arm 26, the support 52 and the position sensor 56, coming from the position sensor 56, and from the telemeters 58, 60, 62.

The control system 31 is also designed to receive position parameters coming from the position sensor 56, the distance parameters coming from the telemeters 58, 60, 62 and information coming from the probe 64.

The operation of the installation 1 will now be described, this operation illustrating a method according to the invention.

The method involves the articulated arm 26 placing the housing 30 in the machining position, the fixing of the housing to the surface that is to be machined 16 by the attachment system 50, the provision, by the position sensor 56, of position parameters indicative of the relative position of the surface that is to be machined with respect to the housing in the machining position, calculation, by the control system 31, of a movement instruction C2 (FIG. 5) for the machining tool 54, using the position parameters, and actuation, by the control system 31, of the support 52 and movement of the machining tool with respect to the housing according to the calculated movement instruction.

The placing of the housing 30 in the machining position optionally involves coarse positioning of the articulated arm 26, then a housing approach phase and finally a phase of the machine tool 28 touching down on the object 5.

The coarse positioning consists in moving the articulated arm 26 so that the inspection hole 10 that is to be machined is within the reach of the machine tool 28. In the example depicted, the control system 31 moves the articulated arm 26 in a translational movement along the rail 24 to bring the articulated arm substantially under the inspection hole, as depicted in FIG. 1. The machine tool 28 is then, for example, approximately 50 mm from the object 5.

During the approach phase, the telemeters 58, 60, 62 provide parameters indicative of the distances D1, D2, D3 making it possible to control parallelism between the opening 32 and a mean plane P' of the surface that is to be machined 16. For example, the control system 31 calculates, from these parameters, an angle θ between the direction Z (which is fixed with respect to the housing 30) and the mean plane P'. In the example depicted, an angle θ of 90° represents perfect parallelism. The more the angle θ decreases, the more the housing 30 diverges from this position of parallelism.

The control system 31 moves the housing 30 in such a way that the angle θ does not deviate from 90° excessively, which means to say so that the plane P and the mean plane P' remain more or less parallel.

As an alternative, the approach phase is performed by keeping control over another parameter, other than the angle θ, indicative of the parallelism between the planes P and P'.

According to yet another alternative form (not depicted), the installation 1 does not have telemeters, and a direct approach is made without any particular control over the parallelism.

Figure 4:
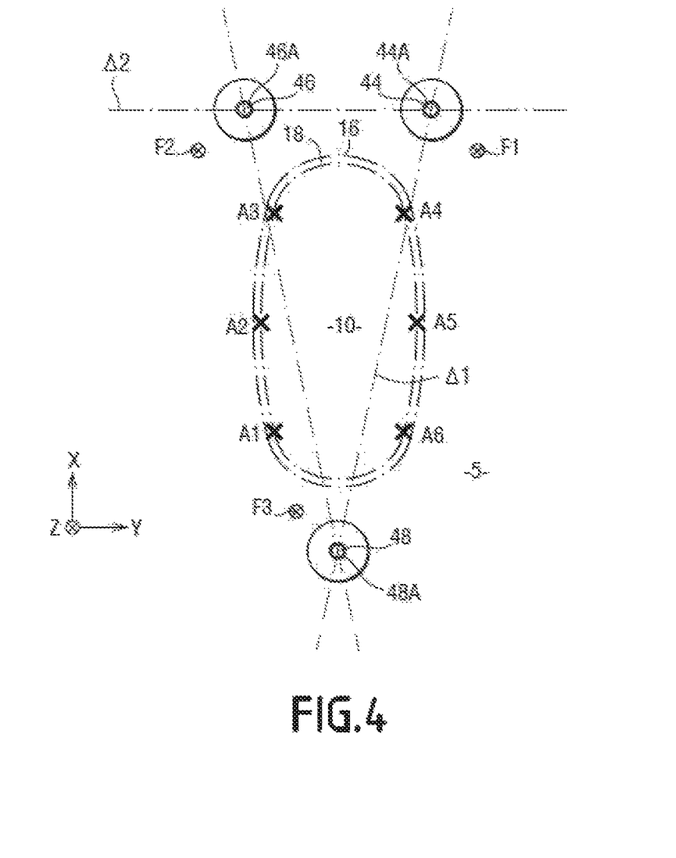
FIG. 4 is a schematic view from beneath, showing the point bearers of the machine tool depicted in FIGS. 1 and 3 with respect to the surface that is to be machined which is depicted in FIGS. 1 and 2.

Optionally, during the housing approach phase, the position sensor 56 is used and one or more position parameters pertaining to the position of the housing 30 with respect to the surface that is to be machined 16 are calculated. The control system 31 evaluates the position parameter or parameters and, if these do not meet predefined criteria, the articulated arm 26 is controlled in such a way as to correct the position of the housing 30 with respect to the surface that is to be machined 16. This allows the inspection hole 10 to be recentred between the bearers 44, 46, 48, as depicted in FIG. 4.

During the approach phase, a number of recentring operations may take place.

Still during the approach phase, and optionally, the inspection hole 10 is recognised by the camera of the position sensor 56 and data regarding the inspection hole 10 and present in the memory 88 of the control system are activated. These are, for example, data regarding the theoretical shape of the inspection hole 10.

The touch-down phase involves applying the three bearers 44, 46, 48 to the surface that is to be machined 16, and measurement by the strain gauges 44A, 46A, 48A of the pressure forces F1, F2, F3 exerted by the bearers on the surface that is to be machined.

The articulated arm 26 is actuated in order to apply pressure to the three bearers 44, 46, 48 in which the strain gauges 44A, 46A, 48A are situated. The values provided by the strain gauges 44A, 46A, 48A are monitored by the control system 31. Advantageously, whichever bearer is the first to touch the surface that is to be machined 16, the pressure exerted by the articulated arm 26 is interrupted if a strain gauge returns a pressure force value higher than a predefined value, for example 15 kg.

Advantageously, application of the three bearers 44, 46, 48 is performed in succession. For example, if the bearer 44 is first to touch the surface that is to be machined 16, then the bearer 44 is loaded until the pressure force F1 reaches a predefined value, for example of 11 kg.

Next, the articulated arm 26 causes the housing 30 to rotate about the point bearer 44 until a second bearer, for example the bearer 46, touches the surface that is to be machined and until the pressure force F2 measured by the strain gauge 46A reaches a predefined value, for example of eleven kilograms. The rotation of the housing 30 about the bearer 44 is performed for example about an axis Δ1 passing through the bearer 44 and through the bearer 48.

Finally, the third bearer, which in this example is the bearer 48, is brought into contact with the surface that is to be machined 16 by moving the housing 30 in rotation about an axis Δ2 that passes through the bearers 44 to 46. Rotation is interrupted when the pressure force F3 measured reaches a predefined value, for example of 11 kg.

As an alternative of course it is possible to bring the bearers 44, 46, 48 into contact in a different order, the procedure for applying the bearers to the surface that is to be machined 16 being able to be deduced by a circular permutation of the procedure described hereinabove.

Such a procedure for applying the bearers 44, 46, 48 makes it possible to obtain a high level of repeatability in the way in which the machine tool 28 is applied to the surface that is to be machined 16 and makes it possible to minimise the extent to which the periphery of the inspection hole 10 is deformed as a result of this application.

In the example depicted, at the end of the touch-down phase, the suction cups 70 are in contact with the surface that is to be machined 16. The vacuum-creating member 72 then creates a vacuum between each of the suction cups 70 and the surface that is to be machined 16 by sucking out the air in between. The housing 30 is then solidly fixed on the surface that is to be machined 16.

The position sensor 56 then provides position parameters indicative of the relative position of the surface that is to be machined 16 with respect to the housing 30 in the machining position. For example, if the inspection hole 10 is an ellipse plotted on a skew surface that has double curvature, six points A1 to A6 (FIG. 4) are identified by the position sensor 56 around the periphery of the inspection hole 10. This for example makes it possible to find the centre of the ellipse in X and Y. By the position sensor 56 identifying three other points closest to the bearers 44, 46 and 48, the position sensor 56 uses triangulation to measure a mean height in Z of the plane P' of the surface that is to be machined.

That makes it possible to calculate an instruction for moving the machining tool 54 in the directions X, Y and Z.

The movement instruction is, for example, a parameterisation of the translational movements of the machining tool 54 to be effected in the directions X, Y, Z and of the changes in orientation by the support 52.

Advantageously, probing is performed in order to correct the movement instruction for the machining tool 54. In order to do this, the probe 64 is initially mounted on the support 52 at the place in which the machining tool 54 will be mounted later.

The support 52 is then moved by the control system 31 with respect to the housing 30 and the control system 31 calculates shape parameters indicative of the true shape of the inspection hole 10. For example, a certain number of probings are performed, advantageously around twenty. The coordinates of these probed points in X, Y and Z make it possible to calculate a curve of the spline type which is then used as a reference to update the path of the machining tool 54 along the axis Z and improve the machining precision.

This makes it possible to correct the movement instruction for the machining tool 54 by using the shape parameters.

Next, the support 52 returns the probe 64 to the magazine 66 and picks up the machining tool 54 stored in the magazine. The machining tool 54 is then mounted on the support 52 where the probe 64 had been.

The actual machining then takes place. The control system 31 actuates the support 52 to move the machining tool 54 with respect to the housing 30 according to the corrected movement instruction.

According to an alternative form which has not been depicted, the magazine 66 is situated on the outside of the housing 30. In order to replace the probe 64 with the machining tool 54, the housing 30 is moved away from the surface that is to be machined 16 by the control system 31 in order to make the substitution.

The articulated arm 26 then repositions the housing 30 in the machining position according to the procedure described hereinabove, making the placement repeatable. Machining is then performed after the second placement into the machining position.

Figure 5:
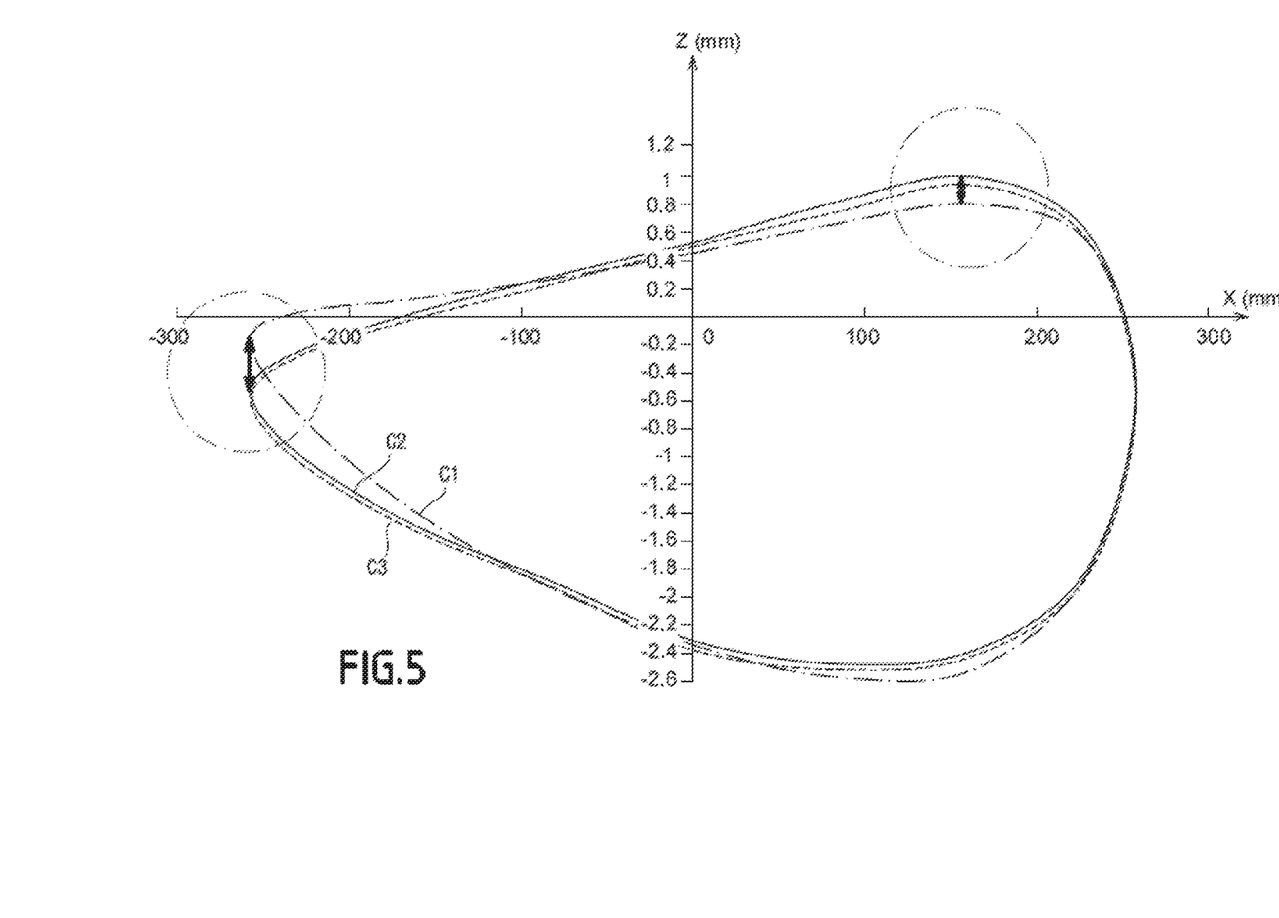
FIG. 5 is a diagram illustrating a movement instruction for moving the machining tool and a corrected movement instruction, with respect to the true shape that is to be machined.

FIG. 5 shows movement instructions C1 and C2 projected onto the directions X and Z associated with the housing 30. These movement instructions can be seen as successive points that the machining tool 54 occupies as it moves to machine the inspection hole 10.

The X coordinate fluctuates between around +250 mm and −250 mm, representing the extent of the inspection hole in the direction X. The fact that the Z coordinate is equal to a few millimetres in the positive direction or in the negative direction illustrates the skew nature of the surface that is to be machined 16.

The movement instruction C1 is an instruction calculated from the shape parameters provided by the position sensor 56, but without any correction afforded by the probing. The curve C3 represents the true shape of the periphery of the inspection hole 10 that is to be machined. As can be seen, the curve C1 differs from the curve C3 at certain points by more than 0.25 mm in the Z-direction of the curve C3. Such positioning errors are acceptable for certain applications, but generally not in aeronautical engineering and this is why correction by probing is advantageously performed.

The curve C2 is the projection onto the directions X and X of the movement instruction as corrected following probing. As can be seen, the curve C2 is far closer than the curve C1 is to the curve C3. Thus, probing makes it possible to reduce the errors to low values (less than 0.1 mm in the direction Z) which are entirely acceptable in aeronautical engineering.

Thus, by virtue of the features described hereinabove, the installation 1 is quick and allows compliance with the machining tolerance.

Furthermore, the optional feature whereby probing is performed makes it possible to obtain a movement instruction that is more precise, reducing machining errors still further.

The optional feature whereby the housing 30 is equipped with telemeters allows control over the parallelism between the housing and the surface that is to be machined 16 during the approach phase.

Finally, having the magazine 66 present inside the housing 30 means that the housing can be left in the machining position while the probe 64 is replaced by the machining tool 54 after the probing has been performed.

What is meant by "secured to the housing" is, for example, that the bearers are fixed with respect to the housing.

The invention claimed is:

1. An installation for machining an object defining a surface that is to be machined, the installation comprising an articulated arm, and a machine tool borne by the articulated arm and comprising:
   a housing defining at least one opening and intended to be placed by the articulated arm in a machining position in which the opening is situated facing the surface that is to be machined,
   at least three bearers secured to the housing and intended to bear against the surface that is to be machined in the machining position,
   an attachment system for fixing the housing to the surface that is to be machined,
   at least one support mounted with the ability to move with respect to the housing, and a machining tool designed to be mounted on the support, and
   at least one position sensor designed to provide position parameters indicative of a relative position of the surface that is to be machined with respect to the housing,
   the installation further comprising a control system designed to actuate the support and move the machining tool with respect to the housing according to a movement instruction, the control system being designed to calculate the movement instruction using the position parameters,
   wherein the at least three bearers are respectively equipped with strain gauges designed to measure pressure forces exerted respectively by the at least three bearers on the surface that is to be machined,
   the control system being designed to bring a first of the at least three bearers into contact with the surface that is to be machined and then bring a second of the at least three bearers into contact, with the first of the at least three bearers remaining in contact, and then bring a third of the at least three bearers into contact, with the first and the second of the at least three bearers remaining in contact, wherein each of the bringings into contact is performed in such a way that the corresponding pressure force progressively reaches a predetermined value.

2. The installation according to claim 1, in which the attachment system comprises at least three suction cups secured to the housing and designed to be pressed against the surface that is to be machined in the machining position, and a vacuum source selectively creating a vacuum between the suction cups and the surface that is to be machined.

3. The installation according to claim 2, in which the at least three bearers are respectively situated substantially in the middle of the at least three suction cups.

4. The installation according to claim 1, in which the machine tool further comprises at least three telemeters designed to respectively provide at least three distance parameters, each distance parameter being respectively indicative of a distance between one of the telemeters and the surface that is to be machined.

5. The installation according to claim 1, further comprising at least one probe designed to be mounted on the support, the control system being designed to move the support and the probe in order to probe the surface that is to be machined and calculate shape parameters indicative of a shape of the surface that is to be machined, the control system being further designed to calculate the movement instruction for the machining tool to take account of the shape parameters.

6. The installation according to claim 5, wherein the at least one probe is designed to be mounted on the support at substantially the same point as the machining tool.

7. The installation according to claim 5, further comprising a magazine designed to accept the probe or the machining tool in respective storage positions.

8. The installation according to claim 1, wherein the object is part of an aeroplane wing.

9. The installation according to claim 1, wherein the surface that is to be machined is the perimeter of an inspection hole.

10. A method for machining an object, the object defining a surface that is to be machined, the method comprising the following steps:
provision of an articulated arm, of a machine tool borne by the articulated arm, and of a control system, the machine tool comprising a housing defining at least one opening, at least three bearers secured to the housing, an attachment system, at least one support mounted with the ability to move with respect to the housing, a machining tool and at least one position sensor mounted on the support;
mounting of the machining tool on the support;
placement of the housing, by the articulated arm, in a machining position in which the opening is situated facing the surface that is to be machined, the placement involving applying the at least three bearers against the surface that is to be machined;
fixing of the housing on the surface that is to be machined using the attachment system;
provision, by the position sensor, of position parameters indicative of a relative position of the surface that is to be machined with respect to the housing in the machining position;
calculation, by the control system, of a movement instruction for the machining tool, using the position parameters; and
actuation, by the control system, of the support and movement of the machining tool with respect to the housing in accordance with the calculated movement instruction,
the method, in which, as the at least three bearers are applied to the surface that is to be machined, strain gauges measure pressure forces exerted respectively by the at least three bearers on the surface that is to be machined, and in which, as the housing is fixed to the surface that is to be machined, suction cups are applied to the surface that is to be machined,
the method further comprising a bringing of a first of the at least three bearers into contact with the surface that is to be machined and then a bringing of a second of the at least three bearers into contact, with the first of the at least three bearers remaining in contact, followed by a bringing of a third of the at least three bearers into contact, with the other first and second of the at least three bearers remaining in contact,
wherein each of the bringings into contact is performed in such a way that the corresponding pressure force progressively reaches a predetermined value.

11. The method according to claim 10, in which:
the machine tool provided comprises at least three telemeters;
the placement of the housing involves provision of at least three distance parameters by the telemeters respectively, each distance parameter being respectively indicative of a distance between one of the telemeters and the surface that is to be machined.

12. The method according to claim 11, in which the placement of the housing involves:
in a housing approach phase, a calculation, by the control system, of at least one parameter indicative of an orientation of the housing with respect to the surface that is to be machined, the calculation using the distance parameters; a controlling of the articulated arm by the control system to take account of the orientation parameter; and optionally a use of the position sensor, a calculation of at least one parameter pertaining to the position of the housing with respect to the surface that is to be machined and a controlling of the articulated arm by the control system in accordance with the position parameter.

13. The method according to claim 10, further comprising:
a mounting of a probe on the support; and
after the placing of the housing in the machining position, a probing of the surface that is to be machined involving: a moving of the support and of the probe with respect to the housing by the control system; and a calculation, by the control system, of shape parameters indicative of a shape of the surface that is to be machined;
the calculation of the movement instruction for the machining tool by the control system using the shape parameters.

14. The method according to claim 13, in which:
the probing takes place after the fixing of the housing to the surface that is to be machined and before the mounting of the machining tool on the support; and
the housing remains fixed to the surface that is to be machined during the mounting of the machining tool on the support.

15. The method according to claim 14, wherein the machine tool comprises a magazine designed to accept the probe or the machining tool in respective storage positions.

16. The method according to claim 13, in which, after probing, the housing is moved away from the surface that is to be machined by the articulated arm, the probe is dismantled from the support, then the machining tool is mounted on the support and the housing is positioned again in order to return the housing to the machining position.

17. The method according to claim 13, further comprising mounting the probe on the support at substantially the same point as the machining tool.

18. The method according to claim 10, wherein the object is a part of an aeroplane wing.

19. The method according to claim 10, wherein the surface that is to be machined is the perimeter of an inspection hole.

\* \* \* \* \*